US006392534B1

(12) United States Patent
Flick (10) Patent No.: US 6,392,534 B1
(45) Date of Patent: *May 21, 2002

(54) REMOTE CONTROL SYSTEM FOR A VEHICLE HAVING A DATA COMMUNICATIONS BUS AND RELATED METHODS

(76) Inventor: Kenneth E. Flick, 5236 Presley Pl., Douglasville, GA (US) 30135

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,980

(22) Filed: Jan. 28, 2000

Related U.S. Application Data (63) Continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] .............................................. B60R 25/10
(52) U.S. Cl. ........................ 340/426; 340/531; 340/533
(58) Field of Search .............................. 340/425.5, 426, 340/427, 428, 429, 531, 532, 533, 534, 825.31, 825.32, 825.69; 307/10.2, 10.3, 10.5; 180/173, 287

(56) References Cited

U.S. PATENT DOCUMENTS

| 4,055,772 A | 10/1977 | Leung ........................ 307/10.1 |
| 4,288,778 A | 9/1981 | Zucker ........................ 340/426 |
| 4,538,262 A | 8/1985 | Sinniger et al. ............ 370/431 |

(List continued on next page.)

FOREIGN PATENT DOCUMENTS

| DE | 195 30 721 A1 | 2/1997 | ............. H02J/9/04 |
| EP | 0 699 562 A2 | 7/1995 | ........... B60R/16/02 |
| WO | WO 97/28988 | 8/1997 | ........... B60R/16/02 |

OTHER PUBLICATIONS

Society of Automotive Engineers, Inc., "Surface Vehicle Information Report," SAE J2058 (Jun. 21, 1990).
Soceity of Automotive Engineers, Inc., "Surface Vehicle Standard," SAE J1850 (rev'd 7/95).
Mark Thompson, "The Thick and Thin of Car Cabling," *IEEE Spectrum*, pp. 42–45 (2/96).

*Primary Examiner*—Van T Trieu
(74) *Attorney, Agent, or Firm*—Allen, Dyer, Doppelt, Milbrath & Gilchrist, P.A.

(57) ABSTRACT

A vehicle control system includes a data communications bus; at least one vehicle device being selectively operable by a user to generate signals on the data communications bus; and a controller, such as a security controller, connected to a receiver and being responsive to a remote transmitter. The controller is also preferably switchable to a desired mode from among a plurality of modes based upon signals generated on the bus by selective operation of the at least one vehicle device by the user. The controller may be an aftermarket security controller that is very easily added to the vehicle and uses an existing vehicle device to switch between modes, without requiring the installation of one or more hardwired and dedicated switches, for example. The at least one vehicle device may comprise at least one desired vehicle switch for also controlling a vehicle operation other than switching the security controller. In addition, the security controller may be switchable based upon signals generated by selectively operating the at least one desired vehicle switch in a predetermined pattern. The at least one vehicle device may also include a plurality of vehicle switches for also controlling vehicle operations other than switching the security controller.

51 Claims, 6 Drawing Sheets

U.S. PATENT DOCUMENTS

| | | | |
|---|---|---|---|
| 4,697,092 A | 9/1987 | Roggendorf et al. | 307/10.1 |
| 4,754,255 A | 6/1988 | Saunders et al. | 340/426 |
| 4,760,275 A | 7/1988 | Sato et al. | 307/10.1 |
| 4,792,783 A | 12/1988 | Burgess et al. | 340/426 |
| 4,841,159 A | 6/1989 | Evans et al. | 307/38 |
| 4,926,332 A | 5/1990 | Komuro et al. | 701/36 |
| 5,006,843 A | 4/1991 | Hauer | 340/5.28 |
| 5,040,990 A | 8/1991 | Suman et al. | 439/34 |
| 5,046,041 A | 9/1991 | Lecocq et al. | 710/42 |
| 5,049,867 A | 9/1991 | Stouffer | 340/426 |
| 5,054,569 A | 10/1991 | Scott et al. | 180/167 |
| 5,081,667 A | 1/1992 | Drori et al. | 340/426 |
| 5,142,278 A | 8/1992 | Moallemi et al. | 340/825.06 |
| 5,146,215 A | 9/1992 | Drori | 340/5.22 |
| 5,243,322 A | 9/1993 | Thompson et al. | 340/429 |
| 5,252,966 A | 10/1993 | Lambropoulos et al. | 340/5.64 |
| 5,406,270 A | 4/1995 | Van Lente | 340/5.54 |
| 5,473,540 A | 12/1995 | Schmitz | 701/1 |
| 5,475,818 A | 12/1995 | Molyneaux et al. | 709/208 |
| 5,481,253 A * | 1/1996 | Phelan et al. | 340/825.31 |
| 5,521,588 A | 5/1996 | Kuhner et al. | 340/825.22 |
| 5,523,948 A | 6/1996 | Adrain | 701/99 |
| 5,555,498 A | 9/1996 | Berra et al. | 701/33 |
| 5,606,306 A | 2/1997 | Mutoh et al. | 340/426 |
| 5,719,551 A | 2/1998 | Flick | 340/426 |
| 5,811,886 A * | 9/1998 | Majmudar | 340/426 |
| 5,832,397 A | 11/1998 | Yoshida et al. | 701/29 |
| 5,838,255 A * | 11/1998 | Di Croce | 340/426 |

\* cited by examiner

REMOTE CONTROL SYSTEM FOR A VEHICLE HAVING A DATA COMMUNICATIONS BUS AND RELATED METHODS

RELATED APPLICATIONS

The present application is a continuation-in-part of U.S. patent application Ser. No. 09/382,245 filed Aug. 25, 1999 now U.S. Pat. No. 6,275,147, which, in turn, is a continuation of U.S. patent application Ser. No. 09/023,838 filed Feb. 13, 1998 now U.S. Pat. No. 6,011,460, which in turn, is a continuation-in-part of U.S. patent application Ser. No. 08/701,356 filed Aug. 22, 1996 now U.S. Pat. No. 5,719,551, the disclosures of all being incorporated herein by reference.

FIELD OF THE INVENTION

This application is related to the field of vehicle control systems and, more particularly, to a remote control system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related go to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to seduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded Communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as including aftermarket vehicle security systems, are not readily adaptable to a vehicle including a data communications bus. A vehicle security system also typically requires a dedicated hardwired switch for entering certain modes, such as a valet mode, to permit another to operate the vehicle. Selectable system operating features are also typically programmed using a dedicated switch, such as the valet switch. In addition, a vehicle security system if adapted for a communications bus and devices for one particular model, model year, and manufacturer, may not be compatible with any other models, model years, or manufacturers. Other systems for remote control of vehicle functions may also suffer from such shortcomings.

SUMMARY OF THE INVENTION

In view of the foregoing background, it is therefore an object of the present invention to provide a vehicle control system and associated methods providing greater ease of installation and operation for a vehicle equipped with a data communications bus, especially for the addition of aftermarket security controllers, for example.

These and other objects, features, and advantages in accordance with the present invention are provided by a vehicle remote control system comprising at least one vehicle device being selectively operable by a user to generate signals on the data communications bus; and a controller, such as a security controller, connected to a receiver and being responsive to a remote transmitter. More particularly, the controller is also preferably switchable to a desired mode from among a plurality of modes based upon signals generated on the data communications bus by selective operation of the at least one vehicle device by the user. The controller may be an aftermarket security controller that is very easily added to the vehicle and uses an existing vehicle device to switch between modes, without requiring the installation of one or more hardwired and dedicated switches, for example.

The at least one vehicle device may comprise at least one desired vehicle switch for also controlling a vehicle operation other than switching the security controller. In addition, the security controller may be switchable based upon signals generated by selectively operating the at least one desired vehicle switch in a predetermined pattern.

The at least one vehicle device may also include a plurality of vehicle switches for also controlling vehicle operations other than switching the security controller. In these embodiments, switching the security controller is accomplished by operating the plurality of vehicle switches in a predetermined pattern.

The system may also include at least one security sensor connected to the security controller. The security controller is also preferably switchable between armed and disarmed modes responsive to the remote transmitter. When the security controller is in the armed mode, it is capable of at least one of generating an alarm indication and disabling a vehicle engine responsive to the at least one security sensor. Accordingly, one of the plurality of modes comprises a valet mode in which there is no alarm indication, the vehicle engine is enabled, and the security controller is no longer responsive to the remote transmitter armed and disarmed signals. Alternately, or in addition, the plurality of modes may comprise an override mode in which there is no alarm indication, the vehicle engine is enabled, and the security controller is responsive to the remote transmitter armed and disarmed signals.

Another possible mode includes a feature programming mode permitting user selection of at least one programmable feature for the security controller. Of course, in this variation the security controller may also be responsive to selective operation of the at least one vehicle device to facilitate selecting the programmable features. Yet another mode for the security controller may be a remote transmitter learning mode permitting learning of a new uniquely coded remote transmitter for the security controller.

Another aspect of the invention relates to compatibility with many different data bus types. To provide this flexibility, the security controller may comprise desired signal enabling means for permitting switching to the desired mode based upon predetermined device signals for a corresponding desired vehicle from a plurality of sets of device signals for different vehicles. In one embodiment, the desired signal enabling means may be provided by a memory for storing a plurality of sets of device signals for different vehicles, and a selector for selecting predetermined device signals from the plurality of different sets of device signals for different vehicles. The selector may comprise a user selector for permitting a user to select the predetermined device signals.

The desired signal enabling means may also comprise bus learning means for learning the predetermined device signals based upon device signals on the data communications bus. The desired signal enabling means may also comprise download learning means for learning the predetermined device signals from a downloading device.

A method aspect of the invention is for switching a controller in a vehicle among a plurality of modes, and wherein the vehicle is of a type comprising a data communications bus, and at least one vehicle device being selectively operable by a user to generate signals on the data communications bus. The method preferably comprises the steps of selectively operating the at least one vehicle device in a predetermined pattern to generate signals on the data communications bus, and reading the signals generated on the data communications bus and switching the controller to a corresponding mode based thereon.

Another method aspect of the invention is for adding a security controller to a vehicle of a type comprising a data communications bus, and at least one vehicle device being selectively operable by a user to generate signals on the data communications bus. The method preferably comprises the steps of connecting the security controller to the data communications bus, and enabling the security controller to switch among a plurality of modes based upon predetermined device signals generated on the data communications bus by selective operation of the at least one vehicle device by the user.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and multiple prime notation are used in alternate embodiments to indicate similar elements.

Figure 1:
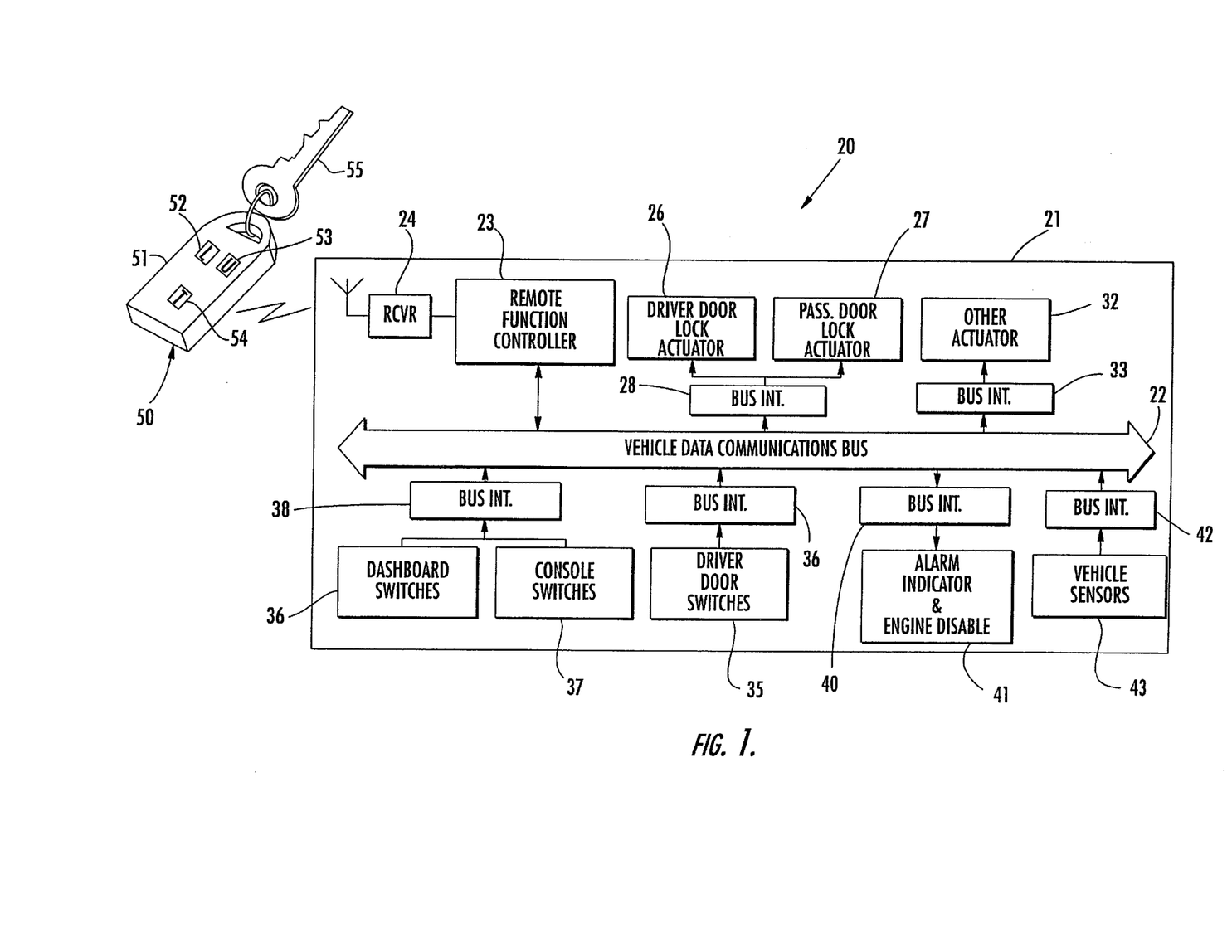
FIG. 1 is a schematic block diagram of the vehicle remote control system in accordance with the invention.

Referring now to the schematic block diagram of FIG. 1, a remote control system 20 for a vehicle 21 in accordance with the invention is first described. The system 20 includes a remote function controller 23 which is illustratively connected to a receiver 24. The controller 23 is also connected to the data communications bus 22 which runs throughout the vehicle as will be appreciated by those skilled in the art.

A number of security and convenience related devices are illustratively connected to the data communications bus 22. For example, a driver door lock actuator 26, and passenger door lock actuator 27 are connected via a common bus interface 28 to the data communication bus 22. Of course, each actuator 26, 27 could have its own individual bus interface or transceiver in other embodiments.

The remote function controller 23 could be used as a remote keyless entry controller to provide lock and unlock commands onto the data bus responsive to the remote transmitter 50 as will be appreciated by those skilled in the art. The illustrated remote transmitter 50 includes a housing 51, a door lock button or switch 52, a door unlock button 53, and a trunk release button 54 in the illustrated embodiment. A panic button, not shown, may be provided on the rear of the housing 51 as will be appreciated by those skilled in the art. The remote transmitter 50 is also illustratively connected to the ignition key 55.

The receiver 24 may be of the changing code type as will be readily appreciated by those skilled in the art. By changing code is meant that the remote transmitter unit 50 sends a signal including a series of bits modulated on a radio frequency carrier, for example. These bits would typically include fixed code portions as well as changing code portions. The changing code portion provides additional security so that unauthorized transmitters cannot be used to activate the controller 23. In particular, the term changing code is meant to cover fairly short repeating codes, such as are generally described as rolling codes. Such rolling codes may repeat as often as every eight transmissions, for example. In addition, changing code is also intended to cover pseudorandom codes that may only repeat after many thousands or even millions of operations as will be understood by those skilled in the art. The remote transmitter unit 50 and receiver 24 are synchronized together with each having the changing code pattern stored therein or generated internally as will be readily understood by those skilled in the art.

One or more other actuators 32 may also be connected to the data communications bus 22 via the schematically illustrated interface 33 as will be appreciated by those skilled in the art. Of course, other controllers may also be connected to and exchange data over the data communications bus 22.

In the lower portion of FIG. 1, a number of other vehicle devices are also schematically illustrated. For example, the vehicle 21 may include dashboard controls or switches 36 and console switches 37 connected to the data communications bus 22 via the illustrated common interface 38. In addition, the driver's door switches 35 may also be connected to the data communications bus 22 via the illustrated interface 36. The driver's door switches 35 may, for example, include door lock and unlock switches, window control switches, etc. as will be readily appreciated by those skilled in the art.

The remote function controller 23 may also provide other security features in addition to providing remote keyless entry features. For example, the remote function controller 23 may be coupled via the data communications bus and interface 40 to the illustrated alarm indicator and/or engine enable/disable device 41. In other words, the remote function controller 23 can provide an alarm indication at the vehicle or an alarm indication remote from the vehicle, and may also be coupled to the engine starter and ignition so as to selectively disable the engine to deter a would-be thief. In other embodiments, these alarm indication and engine disable functions can be hardwired to the controller 23, or a combination of hardwired and data bus communications links could be established as would be readily appreciated by those skilled in the art.

If the remote function controller 23 provides the security function, it will also typically be coupled to one or more vehicle sensors 43 via the data bus 22 and illustrated bus interface 42. Triggering of a vehicle sensor 43, such as a door switch, trunk switch, hood switch, motion or shock sensor would then disable the engine and cause an alarm indication at the vehicle 21.

Figure 2:
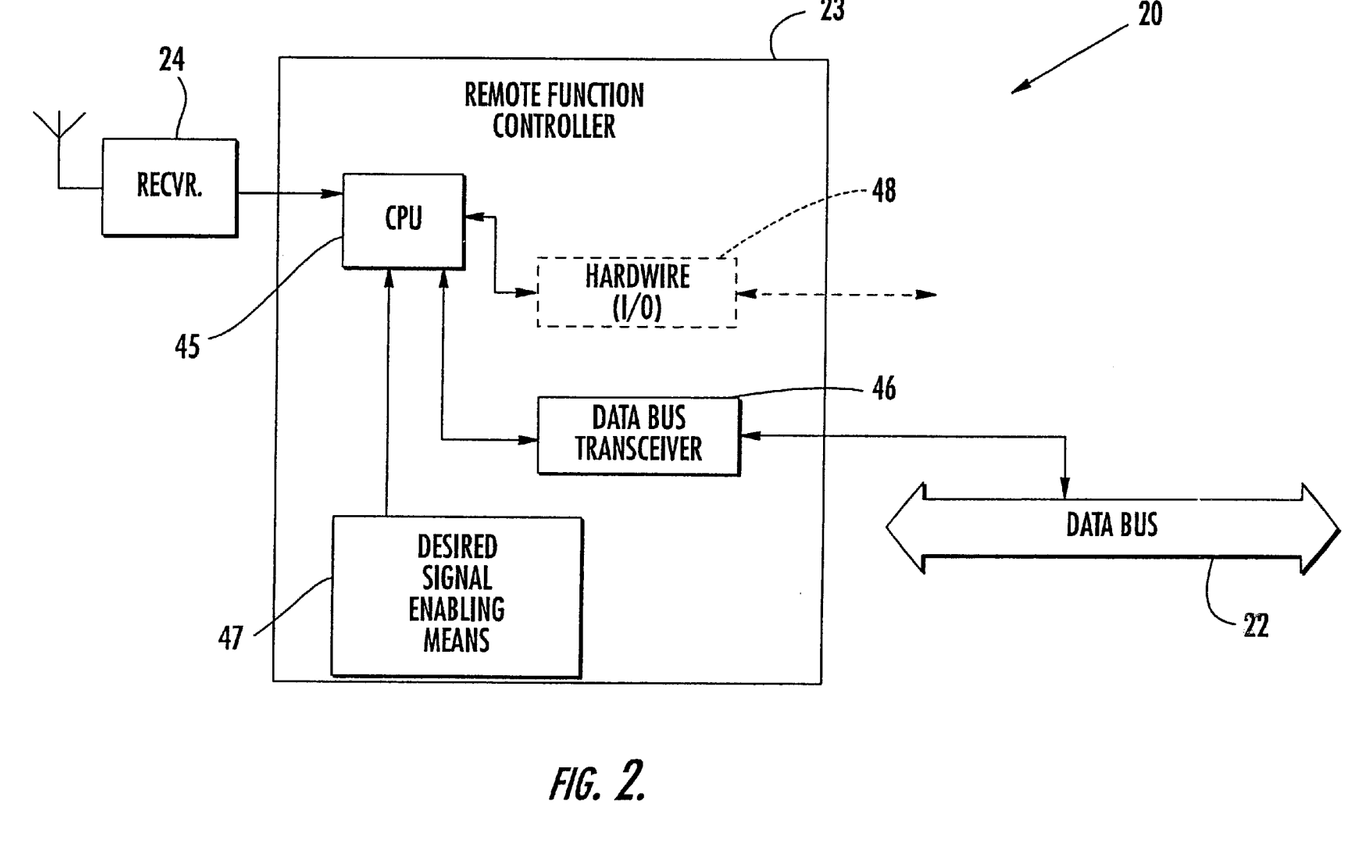
FIG. 2 is a more detailed schematic block diagram of the controller as shown in FIG. 1.

Turning now briefly to FIG. 2, additional details of the remote function controller 23 are now explained. The remote function controller 23 includes a central processing unit (CPU) 45 for performing the various logical and operational functions. A data bus transceiver 46 is coupled to the CPU 45 and provides the interface with the data communications bus 22. An optional hardwire input/output (I/O) interface 48 may also be provided in some embodiments to directly interface with vehicle switches, sensors, etc. as will be readily appreciated by those skilled in the art. The desired signal enabling means 47 is advantageously incorporated into some embodiments of the controller 23 as will be described in greater detail below.

Figure 3:
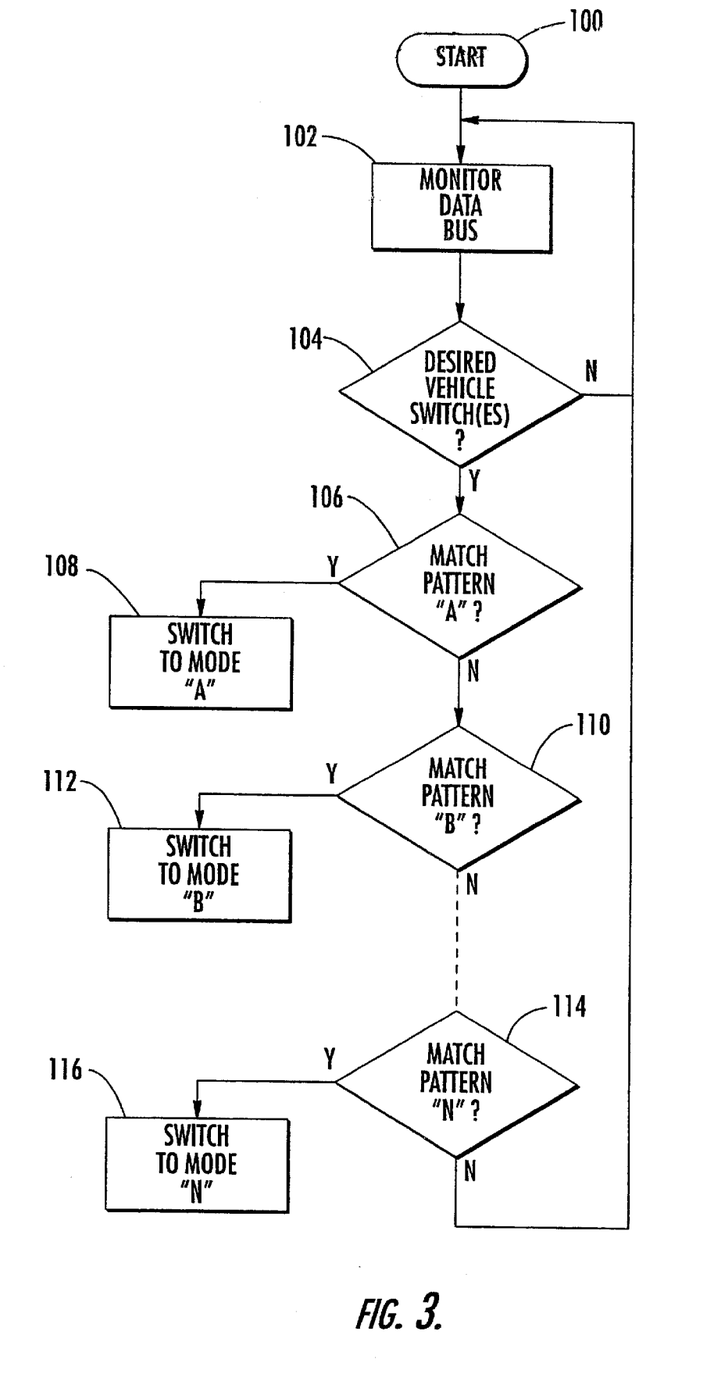
FIG. 3 is a flow chart for a method for selecting from among a plurality of modes in accordance with the present invention.

Turning now additionally to the flow chart of FIG. 3, operation of the vehicle remote control system 20 is further described. In particular, as described above, the vehicle 21 is of a type comprising a data communications bus 22. At least one vehicle device, such as one or more designated vehicle switches, is selectively operable by a user to generate signals on the data communications bus 22 to perform an associated vehicle function or functions. For example, the driver's door lock switch causes locking and unlocking of the driver's door lock. Thus a designated switch can be used to cause the controller 23 to switch to a desired mode in accordance with the present invention.

From the start at Block 100, the data communications bus is monitored (Block 102) by the controller 23. If the signals on the data communications bus 22 are those of the designated or desired switch(es) as determined at Block 104, then it is determined whether the switch has been operated in the desired pattern to enter mode "A", for example. The pattern, of course, may be selected by the user to apply only to his vehicle. In other words, the pattern could provide a PIN code for switching. If pattern A is matched, then the controller 23 switches to mode A (Block 108). Similarly, if the pattern of switch operations as determined at Block 110 matches the corresponding pattern for mode "B", then the controller 23 switches to mode B (Block 112). Continuing along these lines, if the pattern matches for mode "N", then the controller 23 enters mode N at Block 116. This, of course, is a generic example of the present invention. This generic concept can be extended to many desirable vehicle applications, several of which will be explained below and others of which will be readily appreciated by those skilled in the art.

Figure 4:
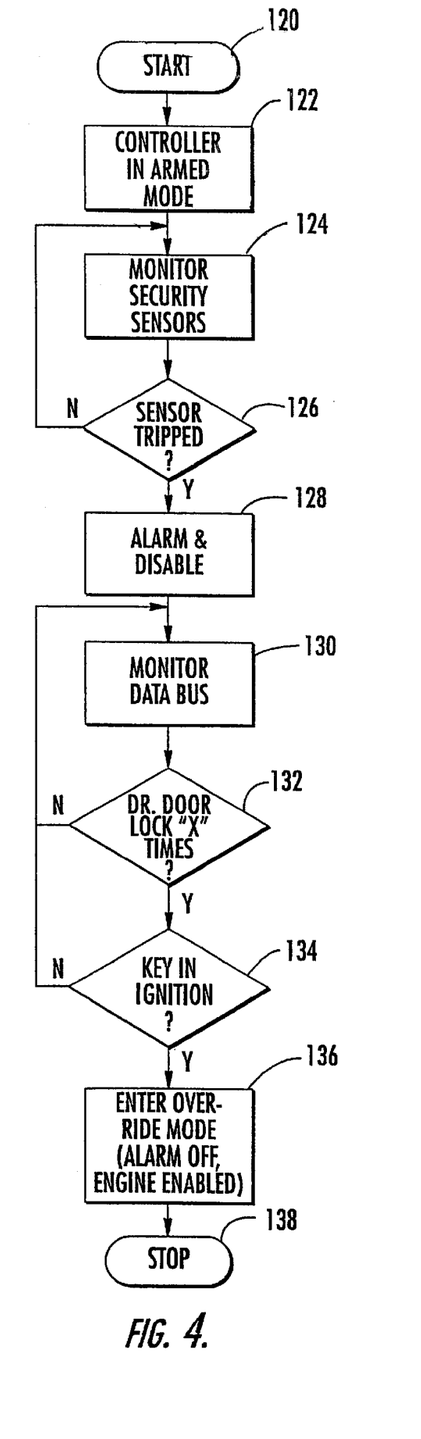
FIG. 4 is a flow chart for a method for switching to an override mode in accordance with the present invention.

Referring now to the flow chart of FIG. 4, an example of the invention implemented for an override feature for a vehicle security system is now described. As will be readily by those skilled in the art, there may be times when the user returns to the vehicle 21 only to find that the remote transmitter 50 is broken, missing, or the battery is dead. Accordingly, the user must enter the vehicle and be able to operate the vehicle, despite being unable to disarm the controller 23 using the remote transmitter 50. In other words, the vehicle alarm may be sounding and the engine disabled if the user enters the vehicle using the key without disarming the controller 23.

An override may be done in a conventional vehicle security system by using a dedicated coded override switch which is hardwired to the security controller. The override switch is depressed in a predetermined pattern to cause the controller to change modes, from an armed mode to an override mode. As described herein the term "override" refers to a mode wherein the alarm indication is prevented or stopped, the vehicle engine is enabled, and the remote transmitter, if available and working, can operate the security controller to switch between armed and disarmed modes. Another similar mode is termed the "valet" mode and wherein the remote transmitter will no longer operate the controller for switching between armed and disarmed.

In accordance with one important aspect of the present invention, the override feature may be provided for a remote function controller 23 by using at least one vehicle switch or device. From the start (Block 120) the controller 23 is set in the armed mode (Block 122), such as either by passive arming or by arming via the remote transmitter 50 as will be appreciated by those skilled in the art. At Block 124 the security sensors 43 are monitored by the controller 23, and if the sensor is tripped as determined at Block 126 an alarm indication may be sounded locally and/or sent to a pager carried by the user or a remote monitoring site. In addition, the vehicle engine is typically disabled to prevent a would-be thief from normally starting and running the engine to steal the vehicle 21. The starter circuit could be selectively interrupted, or the vehicle fuel or ignition could be cutoff, to disable the engine.

The controller 23 monitors the data communications bus 22 at Block 130. If, at Block 132, the door lock switch, for example, is depressed "X" times within a predetermined time window, and the key is in the ignition (Block 134), the controller is switched to the override mode (Block 136) before stopping (Block 138). Of course, in the override mode any alarm indication is stopped and the vehicle engine is no longer disabled as will be appreciated by those skilled in the art. In other embodiments, another vehicle switch or combination of vehicle switches could be selectively operated to switch to the override mode. In addition, although the ignition switch is also monitored in the illustrated embodiment, this is not necessary and other devices could be similarly monitored, such as the driver's door being open, for example.

The controller 23 may be an aftermarket security controller that is very easily added to the vehicle 21 and uses an existing vehicle device connected to the data communications bus 22 to switch between modes, without requiring the installation of one or more hardwired and dedicated switches, for example. As described herein, the at least one vehicle device may comprise at least one desired vehicle switch for also controlling a vehicle operation other than switching the controller 23.

Those of skill in the art will appreciate that the invention is also applicable to implement switching to the valet mode. The controller 23 may also be switched to a transmitter learning mode for permitting the addition of new uniquely coded remote transmitters 50. The transmitter learning mode may be entered, then one or more remote transmitters 50 to be learned are activated adjacent the vehicle 21. The transmitter learning mode may also be used when the controller 23 provides only remote keyless entry functions, or when the controller provides a remote starting feature for the vehicle as will be appreciated by those skilled in the art. Those of skill in the art will also appreciate that the term "remote transmitter" may also include an immobilizer transponder which includes a coded transmitter that communicates with a reader in the vehicle to provide additional security. The term "remote transmitter" is also meant to include a uniquely coded token that is carried with the vehicle key as offered by Omega Research and Development Inc. of Douglasville, Ga. under the mark KEYCOUNT.

Yet another mode that may be switched to is a feature programming mode, as is typically desirable when the remote function controller 23 is an aftermarket security controller. Such controllers 23 typically permit the user to customize a number of features as will be appreciated by those of skill in the art. For example, alarm patterns may be selected, and user acknowledgment in the form of an audible chirp may be selected or turned off. Typically such features can be scrolled through and individually selected. Another advantage of the present invention, is that an existing vehicle switch communicating through the data communication bus 22 may also be used to either effect the scrolling, or select the feature, or both. The remote transmitter 50 can also be used in the feature programming as will be appreciated by those skilled in the art.

If the controller 23 provides a remote start function, such may also have programmable features as will be appreciated by those skilled in the art. For example, the remote start controller may have a periodic start timing feature which periodically starts the vehicle at night, for example, to keep the vehicle warm. Those of skill in the art will appreciate other programming uses for different type controllers as are also contemplated by the present invention.

A method aspect of the invention is for switching the controller 23 in the vehicle 21 among a plurality of modes, and wherein the vehicle is of a type comprising a data communications bus 22, and at least one vehicle device being selectively operable by a user to generate signals on the data communications bus. The method preferably comprises the steps of selectively operating the at least one vehicle device in a predetermined pattern to generate signals on the data communications bus, and reading the signals generated on the data communications bus 22 and switching the controller 23 to a corresponding mode based thereon.

Figure 5:
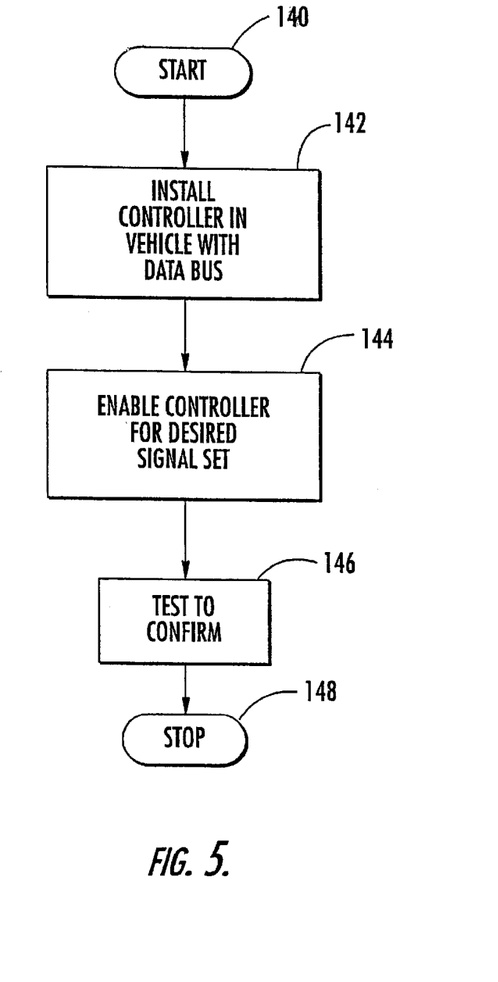
FIG. 5 is a flow chart for a method for installing the security controller in accordance with the present invention.

Another method aspect of the invention is for adding a controller 23 to a vehicle of a type comprising a data communications bus 22 and is explained with reference to the flow chart of FIG. 5. The vehicle 21 also includes at least one vehicle device being selectively operable by a user to generate signals on the data communications bus 22. From the start (Block 140), the method preferably comprises the steps of connecting or installing the controller to the data communications bus at Block 142, and at Block 144 enabling the controller to switch among a plurality of modes based upon predetermined device signals generated on the data communications bus by selective operation of the at least one vehicle device by the user. This controller 23 may also be tested at Block 146 to confirm correct operation before stopping (Block 148).

This desired signal enabling aspect is now described in greater detail with reference to FIGS. 6–10. Looking now at FIG. 6, a first embodiment of the desired signal enabling means 47 is described. The desired signal enabling means 47 permits the remote function controller 23 to operate using a desired set of signals for a desired vehicle from among a plurality of possible sets of signals for different vehicles. As would be readily understood by those skilled in the art, the term different vehicles may include vehicles from different or the same manufacturers, different models, or even different trim levels of the same make and model. Accordingly, the desired signal enabling means 47 permits the controller 23, to communicate with the vehicle devices 36, 37, 35, 41 and 43 via the data communications bus 22.

Figure 6:
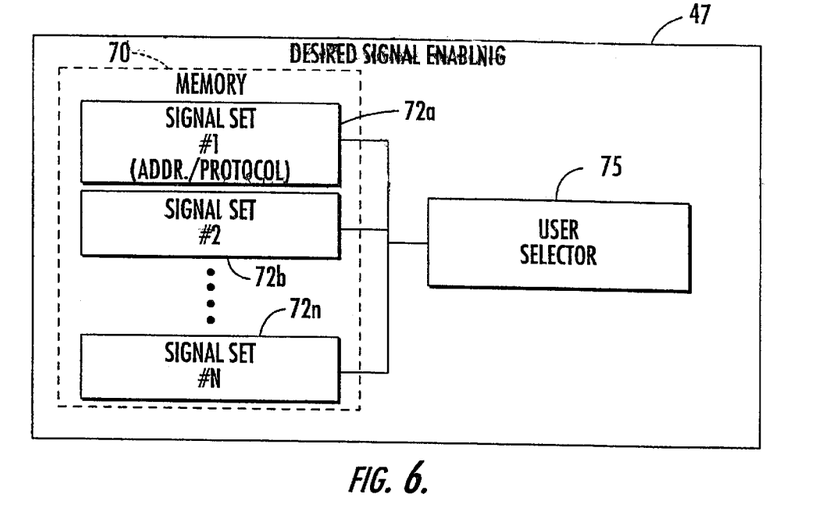
FIG. 6 is a schematic block diagram for a first embodiment of the desired signal enabling portion of the pager controller in accordance with the invention.

In the illustrated embodiment of FIG. 6, the desired signal enabling means 47 may preferably include a memory 70 for storing a plurality of sets 72a, 72b and 72n of signals for different vehicles, and selecting means for selecting the desired set of signals from the plurality of different sets of signals for different vehicles. By storing sets of signals is meant storing information or data necessary to read the desired signals on the data bus 22 as would be readily understood by those skilled in the art. The memory 70 may include a device address memory for storing a plurality of different sets of signals representative of different device addresses for different vehicles. Alternatively, or in addition thereto, the memory may comprise a protocol memory for storing a plurality of different protocols for different vehicles.

The selecting means may comprise a user selector 75 for permitting a user to select the desired set of signals. A keypad or other input device may be used to permit the user to select the desired signal set for his vehicle. The user may select the desired set of signals by entering a unique digital code similar to the selection of signals for a home electronics universal remote control. Other techniques for permitting the user to select the desired signal set from a plurality of stored sets are also contemplated by the invention as would be readily appreciated by those skilled in the art.

Figure 7:
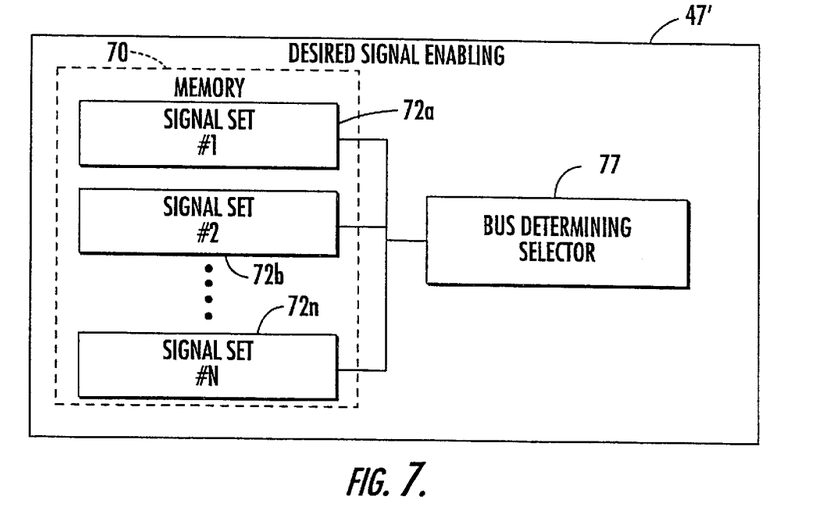
FIG. 7 is a schematic block diagram for a second embodiment of the desired signal enabling portion of the pager controller in accordance with the invention.
Figure 8:
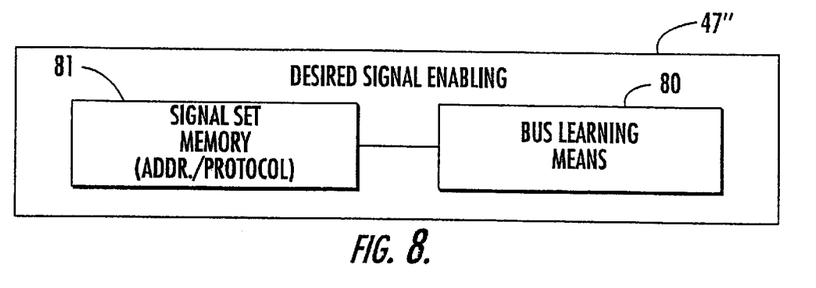
FIG. 8 is a schematic block diagram for a third embodiment of the desired signal enabling portion of the pager controller in accordance with the invention.

Referring now additionally to FIG. 7 another embodiment of the desired signal enabling means 47' is described in accordance with the present invention. In this embodiment, the selecting means may comprise a bus determining selector 77 for determining the desired set of signals based upon signals on the data communications bus. For example, the bus determining selector could determine the desired set of signals based upon sensed voltage levels or based upon the timing of signal pulses on the data communications bus 22.

The other components of this embodiment of the desired signal enabling means 47' are similar to those described above with reference to FIG. 6 and need no further description.

In yet another embodiment of the desired signal enabling means 47" as shown in FIG. 7, the desired signal enabling means comprises a desired signal set memory 81 operatively connected to the illustrated bus learning circuit or means 80. The bus learning circuit or means 80 may determine and store in the signal set memory 81 the protocol and/or device addresses for the vehicle devices. For example, the bus learning circuit or means 80 may permit the user to operate various vehicle devices and store a desired signal set based thereon as would be readily understood by those skilled in the art. The other components of the desired signal enabling means 47" are similar to those described above with reference to FIG. 6 and need no further description.

Figure 9:
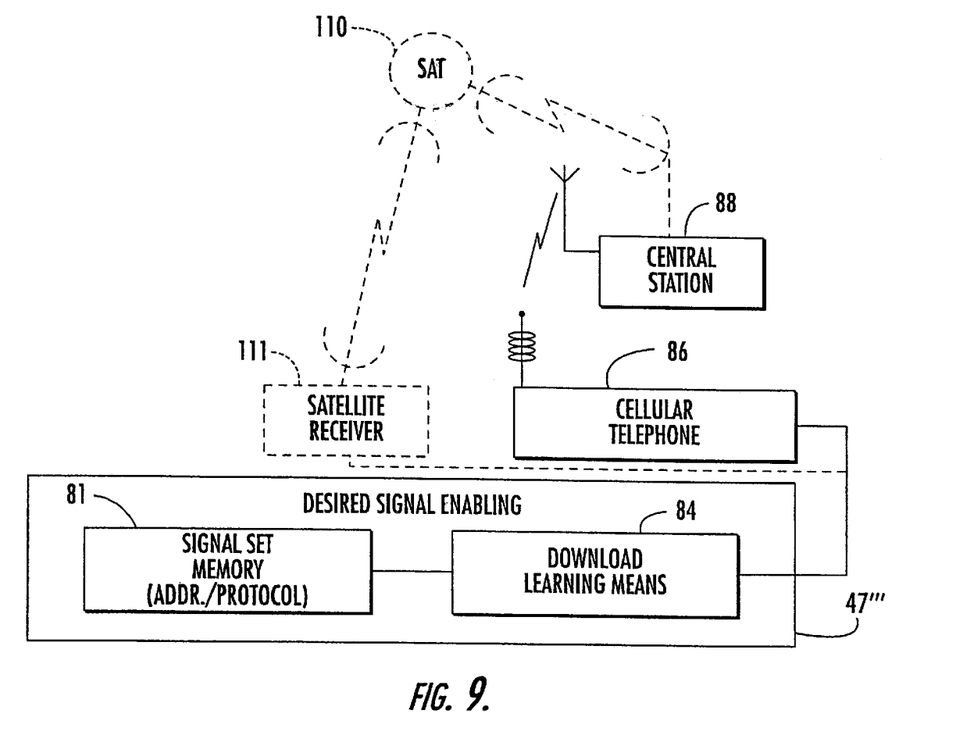
FIG. 9 is a schematic block diagram for a fourth embodiment of the desired signal enabling portion of the pager controller in accordance with the invention.

Still another embodiment of the desired signal enabling means 47'" is explained with reference to FIG. 9. The desired signal enabling means 47'" includes a signal set memory 81 operatively connected to the schematically illustrated download learning means 84. The download learning means 84 may include an interface connected to the illustrated vehicle cellular telephone 86 to permit learning or downloading of the desired signal set from a remote or central monitoring and control station 88, for example. The desired signal set may also alternately be learned from the central station 88 through the satellite link provided by the satellite 110 and vehicle mounted satellite receiver 111 and associated antennas. As would be readily understood by those skilled in the art, the download learning means, as well as the other desired signal enabling leans may be implemented by software in the CPU 45 of the controller 23 or in a separate microprocessor or circuits.

Figure 10:
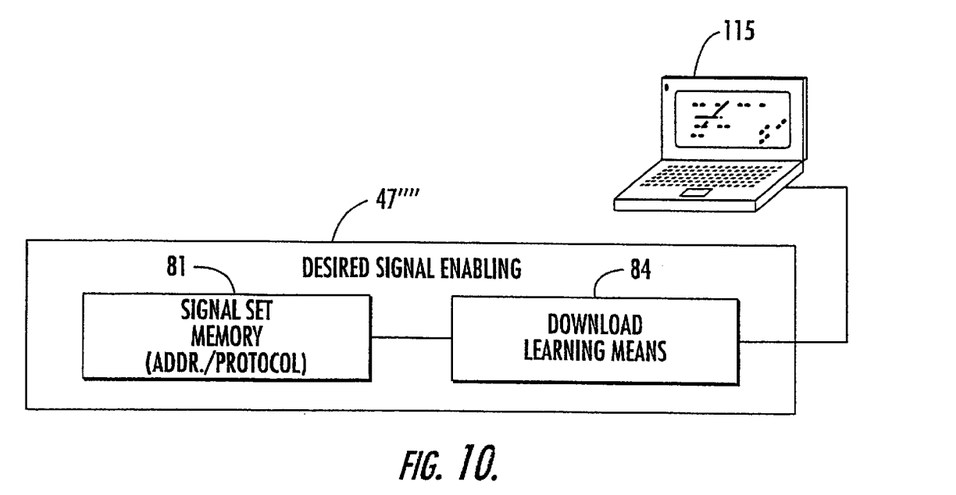
FIG. 10 is a schematic block diagram for a fifth embodiment of the desired signal enabling portion of the pager controller in accordance with the invention.

Turning now additionally to FIG. 10, another variation of programming, learning or downloading of the download learning means 84 is explained. In this variation the download learning means 84 is temporarily connected to a computer, such as the illustrated portable laptop computer 115. The connection, may be via a wire cable or wireless communications link as will be readily understood by those skilled in the art. Of course, the desired signal enabling means 17"" in this embodiment may be programmed in the vehicle or prior to installation in the vehicle. The laptop computer 115 may receive the desired signal set from an Internet website, for example, as will be readily appreciated by those skilled in the art. engine.

Many modifications and other embodiments of the invention will come to the mind of one skilled in the art having the benefit of the teachings presented in the foregoing-descriptions and the associated drawings.

Therefore, it is to be understood that the invention is not to be limited to the specific embodiments disclosed, and that modifications and embodiments are intended to be included within the scope of the appended claims.

That which is claimed is:

1. A vehicle remote control system comprising:

a data communications bus extending through the vehicle;

at least one vehicle device being selectively operable by a user to generate signals on said data communications bus;

a remote transmitter to be carried by the user;

a receiver at the vehicle; and a security controller connected to said receiver and being responsive to said remote transmitter, said security controller also being switchable to a desired mode from among a plurality of modes based upon signals generated on said data communications bus by selective operation of the at least one vehicle device by the user;

said at least one vehicle device for also controlling at least one vehicle operation other than switching said security controller and independent of switching of said security controller.

2. A vehicle remote control system according to claim 1 wherein said at least one vehicle device comprises at least one desired vehicle switch.

3. A vehicle remote control system according to claim 2 wherein said security controller is switchable based upon signals generated by selectively operating the at least one desired vehicle switch in a predetermined pattern.

4. A vehicle remote control system according to claim 1 wherein said at least one vehicle device comprises a plurality of vehicle switches for also controlling vehicle operations other than switching said security controller and independent of switching of said security controller; and wherein switching said security controller comprises operating the plurality of vehicle switches in a predetermined pattern.

5. A vehicle remote control system according to claim 1 further comprising at least one security sensor connected to said security controller; wherein said security controller is switchable between armed and disarmed modes responsive to said remote transmitter; and wherein said security controller when in the armed mode is capable of at least one of generating an alarm indication and disabling a vehicle engine responsive to said at least one security sensor.

6. A vehicle remote control system according to claim 5 wherein the plurality of modes comprises a valet mode in which there is no alarm indication, the vehicle engine is enabled, and said security controller is no longer responsive to said remote transmitter.

7. A vehicle remote control system according to claim 5 wherein the plurality of modes comprises an override mode in which there is no alarm indication, the vehicle engine is enabled, and said security controller is responsive to said remote transmitter.

8. A vehicle remote control system according to claim 1 wherein the plurality of modes comprises a feature programming mode permitting user selection of at least one programmable feature for said security controller.

9. A vehicle remote control system according to claim 8 wherein said security controller, when in the feature programming mode, is also responsive to selective operation of the at least one vehicle device to facilitate selecting the programmable features.

10. A vehicle remote control system according to claim 1 wherein the plurality of modes comprises a remote transmitter learning mode permitting learning of a new uniquely coded remote transmitter for said security controller.

11. A vehicle remote control system according to claim 1 wherein said security controller comprises desired signal enabling means for permitting switching to the desired mode based upon predetermined device signals for a corresponding desired vehicle from a plurality of sets of device signals for different vehicles.

12. A vehicle remote control system according to claim 11 wherein said desired signal enabling means comprises:
a memory for storing a plurality of sets of device signals for different vehicles; and
a selector for selecting predetermined device signals from the plurality of different sets of device signals for different vehicles.

13. A vehicle remote control system according to claim 12 wherein said selector comprises a user selector for permitting a user to select the predetermined device signals.

14. A vehicle remote control system according to claim 11 wherein said desired signal enabling means comprises bus learning means for learning the predetermined device signals based upon device signals on the data communications bus.

15. A vehicle remote control system according to claim 11 wherein said desired signal enabling means comprises download learning means for learning the predetermined device signals from a downloading device.

16. A vehicle remote control system according to claim 15 wherein the plurality of modes comprises a feature programming mode permitting user selection of at least one programmable feature for said security controller.

17. A vehicle remote control system according to claim 16 wherein said security controller, when in the feature programming mode, is also responsive to selective operation of the at least one vehicle device to facilitate selecting the programmable features.

18. A vehicle remote control system according to claim 15 wherein the plurality of modes comprises a remote transmitter learning mode permitting learning of a new uniquely coded remote transmitter for said security controller.

19. A vehicle remote control system according to claim 15 wherein said security controller comprises desired signal enabling means for permitting switching to the desired mode based upon predetermined device signals for a corresponding desired vehicle from a plurality of sets of device signals for different vehicles.

20. A vehicle remote control system comprising:
a data communications bus extending through the vehicle;
at least one vehicle switch being selectively operable by a user to generate signals on said data communications bus;
a remote transmitter to be carried by the user;
a receiver at the vehicle; and
a security controller connected to said receiver and being responsive to said remote transmitter, said security controller also being switchable to a desired mode from among a plurality of modes based upon signals generated on said data communications bus by selective operation of the at least one vehicle switch in a predetermined pattern by the user;
said at least one vehicle switch for also controlling at least one vehicle operation other than switching said security controller and independent of switching of said security controller.

21. A vehicle remote control system according to claim 20 wherein said at least one vehicle switch comprises a plurality of vehicle switches.

22. A vehicle remote control system according to claim 20 further comprising at least one security sensor connected to said security controller; wherein said security controller is switchable between armed and disarmed modes responsive to said remote transmitter; and wherein said security controller when in the armed mode is capable of at least one of generating an alarm indication and disabling a vehicle engine responsive to said at least one security sensor.

23. A vehicle remote control system according to claim 22 wherein the plurality of modes comprises a valet mode in which there is no alarm indication, the vehicle engine is enabled, and said security controller is no longer responsive to said remote transmitter.

24. A vehicle remote control system according to claim 22 wherein the plurality of modes comprises an override mode in which there is no alarm indication, the vehicle engine is enabled, and said security controller is responsive to said remote transmitter.

25. A vehicle remote control system comprising:

a data communications bus extending through the vehicle;

at least one vehicle device being selectively operable by a user to generate signals on said data communications bus; and a controller being switchable to a desired mode from among a plurality of modes based upon signals generated on said data communications bus by selective operation of the at least one vehicle device in a predetermined pattern by the user;

said at least one vehicle device for also controlling at least one vehicle operation other than switching said controller and independent of switching of said controller.

26. A vehicle remote control system according to claim 25 wherein said at least one vehicle device comprises at least one desired vehicle switch.

27. A vehicle remote control system according to claim 25 wherein said at least one vehicle device comprises a plurality of vehicle switches.

28. A vehicle remote control system according to claim 25 wherein said controller comprises a security controller; and further comprising:

a remote transmitter to be carried by a user;

a receiver at the vehicle and connected to said security controller for receiving signals from said remote transmitter for switching said controller between armed and disarmed; and at least one security sensor connected to said security controller;

said security controller when in the armed mode being capable of at least one of generating an alarm indication and disabling a vehicle engine responsive to said at least one security sensor.

29. A vehicle remote control system according to claim 28 wherein the plurality of modes comprises a valet mode in which there is no alarm indication, the vehicle engine is enabled, and said security controller is no longer responsive to said remote transmitter.

30. A vehicle remote control system according to claim 28 wherein the plurality of modes comprises an override mode in which there is no alarm indication, the vehicle engine is enabled, and said security controller is responsive to said remote transmitter.

31. A vehicle remote control system according to claim 28 wherein the plurality of modes comprises a remote transmitter learning mode permitting learning of a new uniquely coded remote transmitter for said security controller.

32. A vehicle remote control system according to claim 25 wherein the plurality of modes comprises a feature programming mode permitting user selection of at least one programmable feature for said controller.

33. A vehicle remote control system according to claim 32 wherein said controller, when in the feature programming mode, is also responsive to selective operation of the at least one vehicle device to facilitate selecting the programmable features.

34. A vehicle remote control system according to claim 25 wherein said controller comprises desired signal enabling means for permitting switching to the desired mode based upon predetermined device signals for a corresponding desired vehicle from a plurality of sets of device signals for different vehicles.

35. A method for switching a controller in a vehicle among a plurality of modes, the vehicle of a type comprising a data communications bus extending through the vehicle, and at least one vehicle device being selectively operable by a user to generate signals on the data communications bus, the method comprising:

selectively operating the at least one vehicle device in a predetermined pattern to generate signals on the data communications bus;

reading the signals generated on the data communications bus and switching the controller to a corresponding mode based thereon; and reading the signals generated on the data communications bus to perform at least one vehicle operation other than switching the controller and independent of switching of said security controller.

36. A method according to claim 35 wherein the controller comprises a security controller.

37. A method according to claim 36 wherein the security controller is also responsive to signals from a remote transmitter carried by the user.

38. A method according to claim 37 wherein the security controller is also responsive to at least one security sensor for at least one of generating an alarm indication and disabling a vehicle engine.

39. A method according to claim 38 wherein the plurality of modes comprises a valet mode in which there is no alarm indication, the vehicle engine is enabled, and said security controller is no longer responsive to the remote transmitter.

40. A method according to claim 38 wherein the plurality of modes comprises an override mode in which there is no alarm indication, the vehicle engine is enabled, and said security controller is responsive to the remote transmitter.

41. A method according to claim 35 wherein the plurality of modes comprises a feature programming mode permitting user selection of at least one programmable feature for the controller.

42. A method according to claim 41 wherein the controller, when in the feature programming mode, is also responsive to selective operation of the at least one vehicle device to facilitate selecting the programmable features.

43. A method according to claim 35 wherein the plurality of modes comprises a remote transmitter learning mode permitting learning of a new uniquely coded remote transmitter for the controller.

44. A method according to claim 35 further comprising the step of enabling the controller to switch to the desired mode based upon predetermined device signals for a corresponding desired vehicle from a plurality of sets of device signals for different vehicles.

45. A method for adding a security controller to a vehicle of a type comprising a data communications bus extending through the vehicle, and at least one vehicle device being selectively operable by a user to generate signals on the data communications bus, the method comprising:

connecting the security controller to the data communications bus;

enabling the security controller to switch among a plurality of modes based upon predetermined device signals generated on the data communications bus by selective operation of the at least one vehicle device by the user;

performing at least one vehicle operation other than switching the controller and independent of switching of the security controller based upon predetermined device signals generated on the data communications bus by selective operation of the at least one vehicle device by the user.

46. A method according to claim 45 wherein the at least one vehicle device comprises at least one vehicle switch.

47. A method according to claim 45 wherein the at least one vehicle device comprises a plurality of vehicle switches.

48. A method according to claim 45 wherein the security controller comprises a memory having stored therein a plurality of sets of device signals for different vehicles and a selector connected to the memory; and wherein the step of enabling comprises using the selector for selecting the predetermined device signals from the plurality of different sets of device signals for different vehicles.

49. A method according to claim 48 wherein the selector comprises a user selector for permitting a user to select the predetermined device signals.

50. A method according to claim 48 wherein the step of enabling comprises learning the predetermined device signals based upon reading device signals on the data communications bus.

51. A method according to claim 45 wherein the step of enabling comprises learning the predetermined device signals from a downloading device.

\* \* \* \* \*

UNITED STATES PATENT AND TRADEMARK OFFICE
CERTIFICATE OF CORRECTION

PATENT NO. : 6,392,534 B1
DATED : May 21, 2002
INVENTOR(S) : Kenneth E. Flick

It is certified that error appears in the above-identified patent and that said Letters Patent is hereby corrected as shown below:

Column 1,
Line 51, delete "related go to" insert -- related to --

Column 3,
Line 55, delete "armed and disarmed" insert -- arm and disarm --
Lines 59-60, delete "armed and disarmed" insert -- arm and disarm --

Column 12,
Line 10, delete "claim 15" insert -- claim 20 --
Line 19, delete "claim 15" insert -- claim 20 --
Line 23, delete "claim 15" insert -- claim 20 --

Signed and Sealed this

Twenty-ninth Day of October, 2002

Attest:

Attesting Officer

JAMES E. ROGAN
Director of the United States Patent and Trademark Office